UNITED STATES PATENT OFFICE.

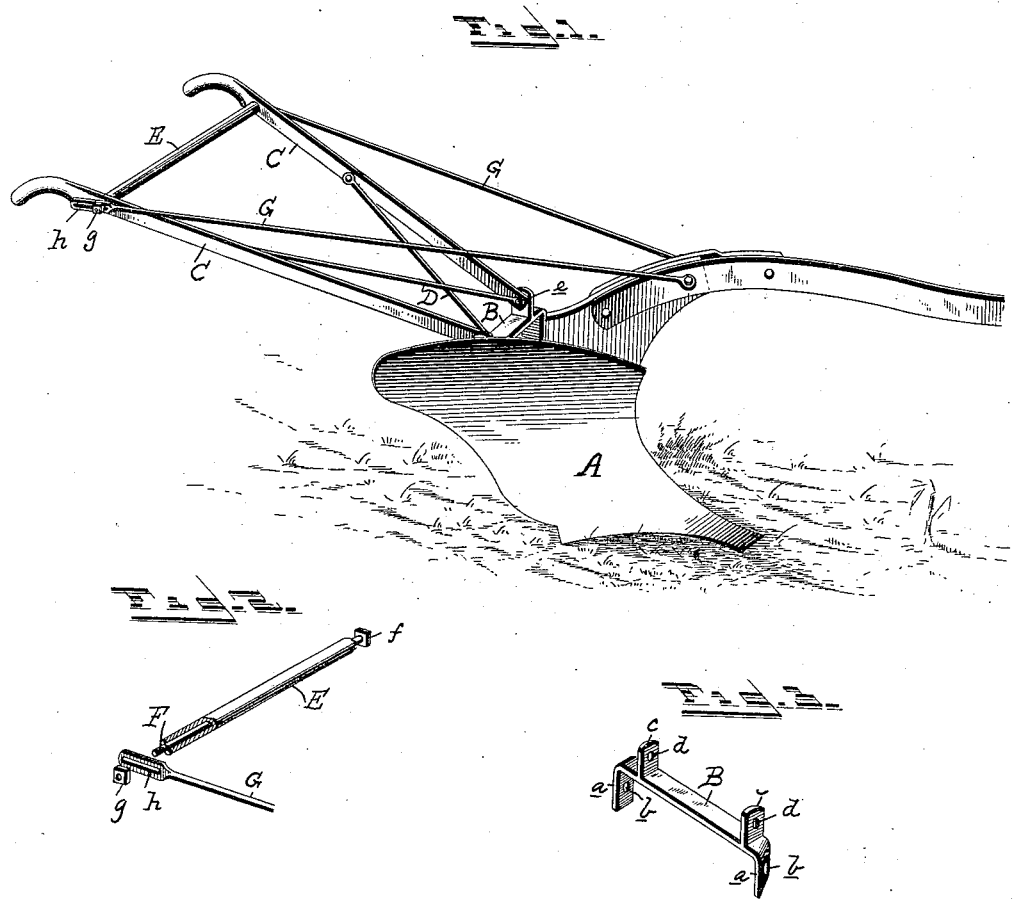

CLARENCE CHRISTIAN SMALLEY, OF MANITOWOC, WISCONSIN.

PLOW.

SPECIFICATION forming part of Letters Patent No. 407,259, dated July 16, 1889.

Application filed March 30, 1889. Serial No. 305,357. (No model.)

*To all whom it may concern:*

Be it known that I, CLARENCE CHRISTIAN SMALLEY, a citizen of the United States, residing at Manitowoc, in the county of Manitowoc and State of Wisconsin, have invented certain new and useful Improvements in Plows; and I do hereby declare that the following is a full, clear, and exact description of the same, reference being had to the annexed drawings, making a part of this specification, and to the letters and figures of reference marked thereon.

This invention relates to certain new and useful improvements in plows; and it has for its objects to provide for the ready adjustment of the handles to accommodate the varying heights of the persons using the same; to provide an improved means of attaching the handles to the plow; to provide a transverse brace between the mold-board and landside, which brace also serves as a means of attachment for the handles and cross-braces, and to otherwise improve upon previous constructions of this character.

To the accomplishment of the above ends, and to such others as the invention may pertain, the same consists in the peculiar combinations and the construction, arrangement, and adaptation of parts, all as more fully hereinafter described, shown in the drawings, and then particularly pointed out in the appended claims.

The invention is clearly illustrated in the accompanying drawings, which, with the letters of reference marked thereon, form a part of this specification, and in which—

Figure 1 is a perspective view of a plow embodying my improvements. Fig. 2 is a perspective detail, partly in section, showing the brace connecting the outer ends of the handles and a portion of one of the side braces. Fig. 3 is a detached perspective view of the transverse brace which connects the landside and mold-board.

Referring, now, to the details of the drawings by letter, A designates the plow proper, between the landside and mold-board of which is arranged the transverse brace B, the construction of which is clearly shown in Fig. 3. This brace is formed with the two downwardly-extending arms $a$, provided with the holes $b$, to receive the bolts or other fastening means which secure it to the landside and mold-board of the plow, and with the upwardly-extending ears or lugs $c$, which are provided with the holes $d$, for a purpose which will soon be made apparent.

C are the handles, which in the present instance are shown as of metal, and these handles are provided at their lower ends with suitable holes, through which and the holes $d$ in the ears or lugs $c$ pass the transverse pins or bolts $e$, which thus pivotally secure the lower ends of the handles to said ears or lugs. In order to brace the handles, I provide the cross short brace-rods D, the upper ends of which are secured to the handles, as shown, and the lower ends secured to the ears $c$ by means of the bolts $e$, which pivot the lower ends of the handles to said lugs. The handles near their upper ends are connected by the cross-piece E, preferably of gas-pipe, through which is passed the long rod or bolt F, provided upon one end with a square head $f$, and at the other end screw-threaded and provided with a removable nut $g$.

G are long braces connected at their forward ends to the plow or to the beam in any suitable manner and at their outer ends provided with elongated slots $h$, as shown in Figs. 1 and 2, and through these slots pass the long bolt F.

By the construction above described the handles may be readily adjusted vertically by simply loosening the nut $g$ on the end of the bolt F and moving the handles on their pivots at their lower ends either up or down, as the case may require, and when in their proper position simply tightening the nut holds them in their adjusted position.

I have shown the handles as of metal, but of course do not wish to restrict myself to the employment of the features above outlined in connection with metallic handles, as it is evident that the same may be readily applied in connection with wooden handles without departing from the spirit of the invention. In case wooden handles are employed it would be advisable to have a small metallic plate or casting on the lower ends of said wooden handles, by which they could be pivoted to the transverse brace, or the lower ends of the wooden handles might be flattened or broadened for this purpose.

What I claim as new is—

1. The combination, with the landside and mold-board and the transverse brace connecting the same, of the handles pivotally connected at their forward ends with the said brace, and the braces G, pivotally connected at their forward ends with the plow-beam and at their rear ends slotted and adjustably connected with the handles near the rear ends of the latter, substantially as and for the purpose specified.

2. In a plow, the combination, with the landside and mold-board and transverse brace, of the handles pivoted to the brace at their forward ends, the cross-piece E, connecting the handles near their rear ends, the braces G, pivotally connected at their forward ends to the plow-beam and slotted at their rear ends, and the transverse bolt F, passed through the piece E and through the slots of the braces G, and provided with the nut $g$, substantially as shown and described.

In testimony that I claim the above I have hereunto subscribed my name in the presence of two witnesses.

CLARENCE CHRISTIAN SMALLEY.

Witnesses:
    CHARLES SPENCER CARMAN,
    C. HERMOGENE SMALLEY.